United States Patent [19]

Fray

[11] Patent Number: 5,211,901
[45] Date of Patent: May 18, 1993

[54] PROGRESSIVE MOULDING OF COMPOSITE MATERIALS

[75] Inventor: Joseph Fray, Woodford, Great Britain

[73] Assignee: British Aerospace Public Limited Company, London, England

[21] Appl. No.: 836,860

[22] Filed: Feb. 19, 1992

[51] Int. Cl.$^5$ .................. B29C 43/22; B29C 53/00; B31F 1/20; B32B 31/00

[52] U.S. Cl. .................. 264/280; 264/167; 264/257; 264/258; 264/296; 264/320; 264/323; 264/324

[58] Field of Search .............. 264/257, 258, 324, 325, 264/296, 294, 280, 137, 323, 284-286, 167, 320

[56] References Cited

U.S. PATENT DOCUMENTS

| | | | |
|---|---|---|---|
| 3,243,489 | 3/1966 | Porepp | 264/296 |
| 3,339,004 | 8/1967 | Nardone | 264/296 |
| 3,453,359 | 7/1969 | Clement et al. | 264/296 |
| 3,798,299 | 3/1974 | Gumm et al. | 264/255 X |
| 3,836,622 | 9/1974 | Sporre | 264/296 X |
| 4,025,599 | 5/1977 | Keith | 264/285 X |
| 4,335,587 | 6/1982 | Thomamueller et al. | |
| 4,386,044 | 5/1983 | Arndt et al. | 264/296 X |
| 4,657,717 | 4/1987 | Cattanach et al. | 264/257 X |
| 4,865,797 | 12/1989 | Järvenkylä | 264/167 X |
| 5,114,654 | 5/1992 | Hosoi | 264/285 X |

Primary Examiner—Karen Aftergut
Attorney, Agent, or Firm—Cushman, Darby & Cushman

[57] ABSTRACT

A method of progressively molding and curing-/homogenising a composite material component assembly including a skin panel and a series of spaced structurally reinforcing members therefor. The method includes the steps of placing a composite material layer (18) on support (13), clamping same to the support by a mold including first and second tools (14/16), the second tool being separated from the first tool by a pre-determined amount, slidably moving the second tool (16) towards the first tool (14) to cause the material to fold in an upwards direction until clamped between datum faces (15, 17) of the tools to define the structural member, heating the support (13) and tools (14, 16) to cure/homogenise the skin panel and structural members, then slidably moving the component along the support (13) a pre-determined amount to draw a further quantity of composite material layer (18) from a source and repositioning the tools (14, 16) for further processing of the material.

1 Claim, 2 Drawing Sheets

PROGRESSIVE MOULDING OF COMPOSITE MATERIALS

BACKGROUND TO THE INVENTION

This invention relates to a method and apparatus for progressively molding and curing/homogenising composite materials. This term will hereinafter be generally referred to as 'molding'. It is particularly, though not exclusively, concerned with the progressive manufacture of multiple element components where certain elements in a component assembly are repeatable both in their configuration and in their inter-element separation.

DESCRIPTION OF THE PRIOR ART

Known component assemblies of this type include aircraft structural elements such as skin panel assemblies comprising a skin panel and a series of longitudinal stringers mounted upon the skin panel. These stringers are generally of constant cross-sectional form and of constant pitch, i.e. dimensional separation across the skin panel, but, depending upon structural considerations, there may be a requirement for stringers having different cross-section or variations in pitch.

Structural assemblies of the type described above are commonly manufactured from composite materials e.g. carbon fibre, for reasons of lightness in an aircraft structure. They may be molded from woven or non-woven textile materials which incorporate a filamentary matrix material (frequently known as co-mingled pre-preg). The component parts are generally formed or molded by hand and in their uncured state brought together as an assembly by what is termed hand lay-up before being subjected to a curing process. This is a tedious and time consuming process and it is the object of the present invention to provide an improved method and apparatus for progressively molding a composite material component assembly within a single operation.

SUMMARY OF THE INVENTION

According to one aspect of the present invention, there is provided a method of progressively molding a composite material component assembly comprising a skin panel and a series of upstanding integrally formed, longitudinally extending structural members and including the steps of:

placing a composite material layer on support means, clamping said material layer to said support means by molding means comprising first and second tool means in which said second tool means is laterally separated from said first tool means a pre-determined amount, slidably moving said second tool means towards said first tool means whereby said material is caused to fold in an upward direction until clamped between datum faces of said first and second tool means to define said structural member, heating said support means and first and second tool means a pre-determined amount and locally subjecting the skin panel and integrally formed structural members to a molding cycle, slidably moving the component along said support means a pre-determined amount on completion of the curing cycle, thereby drawing from source a further quantity of composite material layer and repositioning said forming means for further processing of said material.

whereby a composite structural panel is progressively molded.

BRIEF DESCRIPTION OF THE DRAWINGS

Alternative embodiments of the invention will now be described, by way of example only, and with reference to the accompanying drawings in which.

DESCRIPTION OF THE PREFERRED EMBODIMENT

Figure 8:
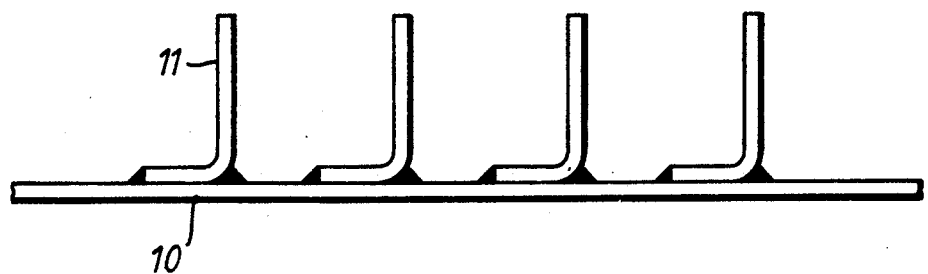
FIG. 8 illustrates a prior art composite structure of conventional construction.

Referring to the drawings, FIG. 8 shows one example prior art arrangement of composite structure assembly comprising a skin panel 10 having located thereto a series of longitudinal stringers 11.

Both the skin and the stringers are of suitable composite material, the stringers formed as individual components and assembled to the skin-panel by hand-lay-up. To maintain proper location of the stringers during the manufacturing process the assembly will be made in a suitable fixture including means for holding each stringer at its datum position and the whole assembly will be subjected to an appropriate cure cycle.

The object of the present invention is to provide a method and apparatus for progressively forming and simultaneously curing/homogenising a composite skin stringer combination from a single sheet of composite material.

Figure 1:
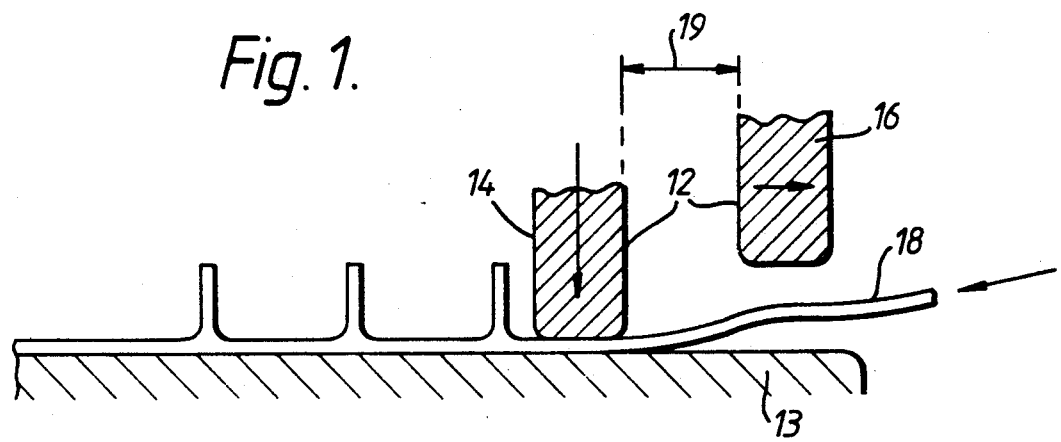
FIGS. 1, 2 and 3 illustrate progressive forming and molding steps for one composite material structural arrangement.
Figure 2:
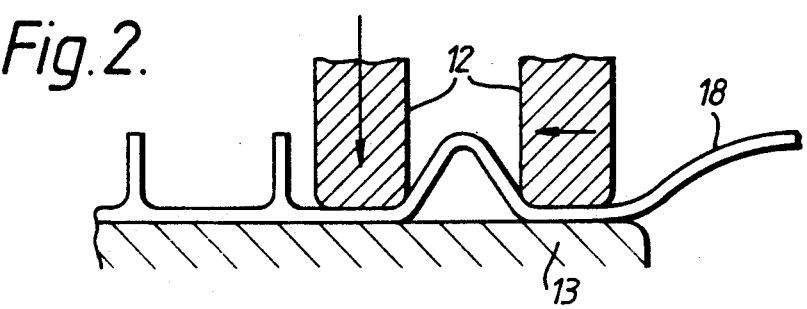
Figure 3:
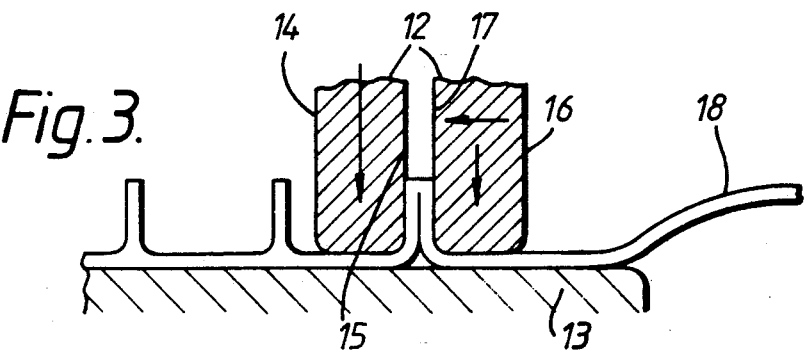

One embodiment of the invention is shown in FIGS. 1-3 inclusive. The apparatus includes a multi-element heated molding tool assembly 12 positioned above a heated bed 13 by which means the composite component is molded. In this embodiment the molding tool 12 comprises a clamping tool assembly 14 providing a datum face 15 and which is generally constrained to move in a vertically upwards or downwards direction and a form tool 16 which, in addition to vertical displacement, is translatable laterally. This form tool 16 also includes a datum face 17. Although only shown here in cross-section, the bed 13 and tools 14 and 16 extend longitudinally dependent on stringer length requirements.

Although the tools 14 and 16 move independently in the manner described, the molding tool assembly 12 per se is movable laterally in a shuttle action by which means the component assembly progressively moves along the bed 13 on completion of each forming and curing cycle.

Bed and tool heating is achieved by means not described here and the degree of heat and the pressure applied to the composite material will vary from one material to another and may similarly be variable dependent on the section to be formed. The process is particularly suited to the molding of woven or non-woven textile materials which include a filamentary matrix material (frequently known as co-mingled pre-preg). The use of the process would not however be confined to these materials nor even to thermoplastic materials.

In operation, the selected composite material sheet 18 is drawn from an adjacent stowed source (not shown) and positioned upon the bed 13. The tool 14 is lowered into clamping engagement with the material whilst the tool 16 is moved to the right (as viewed in FIG. 1) to give a pre-determined separation 19, and is raised to a position above the material 18. The separation 19 is determined by the dimensional and configuration requirements of the stringer section to be formed.

As shown in FIG. 2 with the material 18 suitably positioned and clamped by the tool 14, the tool 16 is lowered into clamping engagement with the material and moved laterally as indicated by the arrow, folding the material to assume a vertical stringer of pre-determined thickness and height, as shown in FIG. 3 the heated tooling simultaneously applying a heat and pressure cycle to both the stringer section and the skin panel. On completion of the cure cycle, the component assembly is slidably moved along the bed 13, drawing further material into position from source for processing by the forming tool 12. By this means, progressive manufacture of a composite skin/stringer component is achieved.

Figure 4:
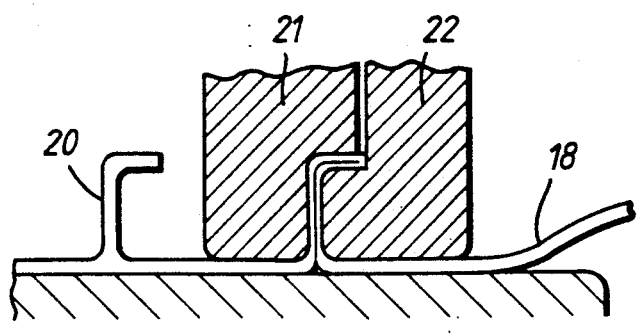
FIG. 4 illustrates forming and molding tools for achieving an alternative composite structural arrangement.
Figure 5:
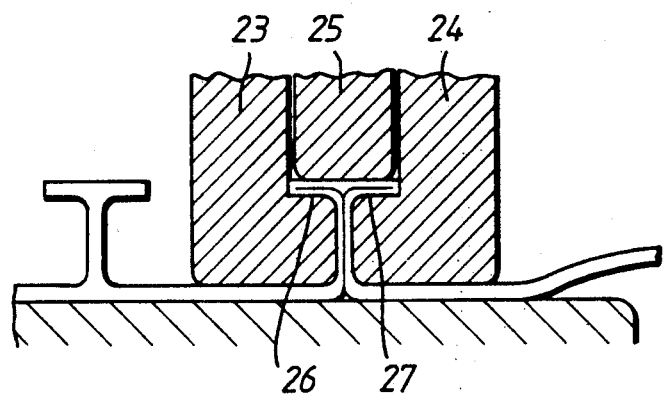
FIG. 5 illustrates forming and molding tools for achieving yet a further alternative composite structural arrangement.

FIGS. 4 and 5 make provision for achieving alternative stringer sections by a substantially similar process. FIG. 4 shows the formation of a stringer section 20 by the use of tools 21 and 22 having appropriate steps by which means the material when folded will be molded into the desired cross-section.

FIG. 5 is of greater complexity in order to achieve a T-Sectioned stringer form and requires, in addition to heated tools 23 and 24 (which function as the tools 14 and 16 of the FIG. 1 embodiment), a further tool 25 having vertical displacement capability to co-operate with the steps 26 and 27 to achieve the desired result.

Figure 6:
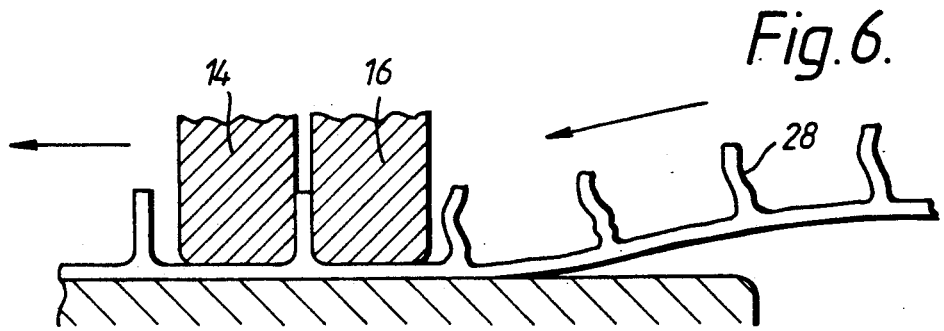
FIG. 6 illustrates progressive forming and molding steps for a composite material structural arrangement in which the material is pre-formed textile.

As an alternative, but equally effective embodiment, the material may be pre-formed as a textile pre-preg in three-dimensional form, such that, as shown in FIG. 6 for example, the stringer form 28 is already incorporated and the forming tools 12 may be adapted so that the tools 14 and 16 merely apply the necessary curing heat and pressure and no material folding is involved.

Figure 7:
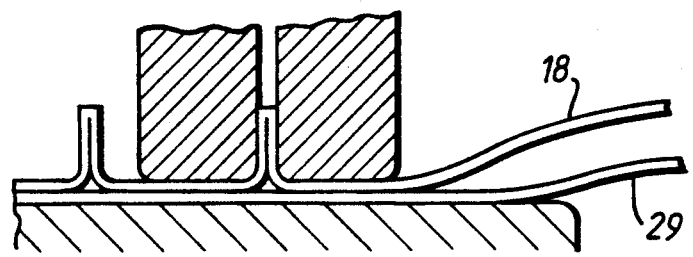
FIG. 7 illustrates progressive forming and molding arrangement utilising multiple composite layers.

FIG. 7 illustrates one further embodiment. It may frequently be necessary that, at least over part of a skin panel assembly, the skin panel may require to be of increased thickness. This embodiment therefore introduces an additional composite layer 29 drawn from a separate source (not shown) and which moves and is molded simultaneously with the composite layer 18.

The process may, as necessary, be followed by a secondary hot molding (e.g. to final shape) operation.

The material employed may be thermosetting as well as thermoplastic or possibly through one stage to another.

The finished section could be made non-uniform in length, width or both (e.g. could be made to taper in length). Finally, the method could be used with either a composite or homogeneous material.

I claim:
1. A method of progressively molding and curing a composite material component assembly including a skin panel and a series of upstanding, integrally formed, longitudinally extending structural members, comprising:
   (a) drawing a quantity of a layer of composite material from a source and supporting a respective portion of said layer on a support;
   (b) clamping said portion of said layer against said support using a mold comprising first and second tools which are separated from one another a predetermined amount and have respective datum faces which spacedly confront one another;
   (c) slidably moving one of said tools relatively toward the other of said tools whereby said layer of composite material, between said tools, progressively bows away from said support and folds, becoming clamped between said datum faces as a two-layer precursor for a respective said upstanding, longitudinally extending structural member, integral with said layer of composite material;
   (d) heating said support and said tools a predetermined amount to thereby subject said portion of said layer of composite material to a curing cycle and thus convert said two-layer precursor into a respective said upstanding, longitudinally extending structural member integral with said layer of composite material, and thus form said layer of composite material into said skin panel;
   (e) slidably moving said layer of composite material along said support a predetermined amount by using said tools, thereby drawing a further quantity of said layer of composite material from said source and supporting a respective further portion of said layer of composite material on said support;
   (f) withdrawing said tools away from said layer of composite material and repositioning said tools so that said first and second tools are again separated from one another by said predetermined amount and with said respective datum faces spacedly confronting one another; and
   (g) repeating steps (b)–(f) a plurality of times with respect to successive further portions of said layer of composite material to progressively form said composite material component assembly including said skin panel and said series of said upstanding, integrally formed, longitudinally extending structural members.

* * * * *